US010275580B2

(12) United States Patent
Aillery et al.

(10) Patent No.: US 10,275,580 B2
(45) Date of Patent: Apr. 30, 2019

(54) METHOD OF AUTHENTICATING A USER OF A TERMINAL WITH A SERVICE PROVIDER

(75) Inventors: Nicolas Aillery, Rennes (FR); Benoit Bailleux, Ploubezre (FR); Jean-Pierre Le Rouzic, Rennes (FR)

(73) Assignee: Orange, Paris (FR)

( * ) Notice: Subject to any disclaimer, the term of this patent is extended or adjusted under 35 U.S.C. 154(b) by 395 days.

(21) Appl. No.: 13/994,228

(22) PCT Filed: Dec. 9, 2011

(86) PCT No.: PCT/FR2011/052913
§ 371 (c)(1),
(2), (4) Date: Jun. 14, 2013

(87) PCT Pub. No.: WO2012/080625
PCT Pub. Date: Jun. 21, 2012

(65) Prior Publication Data
US 2013/0263286 A1 Oct. 3, 2013

(30) Foreign Application Priority Data
Dec. 16, 2010 (FR) ...................................... 10 60589

(51) Int. Cl.
*G06F 21/31* (2013.01)
*H04L 9/32* (2006.01)
(52) U.S. Cl.
CPC ............ *G06F 21/31* (2013.01); *H04L 9/3215* (2013.01)
(58) Field of Classification Search
CPC ............. G06F 21/30; G06F 21/44; H04L 9/32

USPC .................. 726/4, 9; 713/156, 168; 455/411
See application file for complete search history.

(56) References Cited

U.S. PATENT DOCUMENTS

| | | | | |
|---|---|---|---|---|
| 7,221,932 | B2 * | 5/2007 | Ido | G06F 21/445 380/247 |
| 7,283,808 | B2 * | 10/2007 | Castell | H04L 12/589 370/401 |
| 8,082,591 | B2 * | 12/2011 | Gu | H04L 63/08 713/168 |
| 8,301,910 | B2 * | 10/2012 | Perepa | G06F 21/10 380/30 |
| 8,352,323 | B2 * | 1/2013 | Fisher | 705/16 |

(Continued)

OTHER PUBLICATIONS

Gieseke et al., "Secure Web Authentication with Mobile Phones Using Keyed Hash Authentication," CSCI E 170 Computer Security and Usability, pp. 1-13, retrieved from internet website: http://simpson.net/ref/2004/csci_e-170/handouts/final/egieseke-john_mclaughlin_paper.pdf (Jan. 11, 2005).

(Continued)

*Primary Examiner* — Lynn D Feild
*Assistant Examiner* — Viral S Lakhia
(74) *Attorney, Agent, or Firm* — Drinker Biddle & Reath LLP

(57) ABSTRACT

A method of authenticating a user of a terminal referred of as a first terminal, and suitable for communicating with a service provider via a first communications network, the provider requesting an authentication of the user of the first terminal before providing a service to the first terminal, wherein the authentication of the user is based on user authentication performed with regard to a second terminal.

4 Claims, 4 Drawing Sheets

(56) References Cited

U.S. PATENT DOCUMENTS

| | | | | |
|---|---|---|---|---|
| 8,608,535 | B2* | 12/2013 | Weston | A63F 13/10 463/1 |
| 8,627,438 | B1* | 1/2014 | Bhimanaik | H04L 63/10 726/9 |
| 8,824,960 | B2* | 9/2014 | Khan | 455/41.1 |
| 2006/0189319 | A1* | 8/2006 | Houldsworth | H04N 7/163 455/445 |
| 2007/0086372 | A1* | 4/2007 | Lee | G06F 21/10 370/328 |
| 2007/0136573 | A1* | 6/2007 | Steinberg | G06F 21/32 713/155 |
| 2008/0134318 | A1* | 6/2008 | Yoshimoto | G06F 21/305 726/19 |
| 2009/0125984 | A1* | 5/2009 | Bilger | H04L 9/321 726/4 |
| 2009/0158034 | A1* | 6/2009 | Gu | H04L 63/08 713/156 |
| 2009/0204235 | A1* | 8/2009 | Dubinsky | G06Q 10/0635 700/32 |
| 2009/0274302 | A1* | 11/2009 | Wu | H04L 63/06 380/272 |
| 2009/0288148 | A1* | 11/2009 | Headley | H04L 9/3271 726/5 |
| 2010/0005296 | A1* | 1/2010 | Headley | H04L 9/3226 713/168 |
| 2010/0061294 | A1* | 3/2010 | Proctor, Jr. | H04W 4/029 370/328 |
| 2010/0082990 | A1* | 4/2010 | Grigorovitch | H04W 12/06 713/176 |
| 2010/0223471 | A1* | 9/2010 | Fresko | H04L 63/08 713/176 |
| 2010/0275010 | A1* | 10/2010 | Ghirardi | G06F 21/35 713/155 |
| 2011/0212707 | A1* | 9/2011 | Mahalal | 455/411 |
| 2011/0215921 | A1* | 9/2011 | Ben Ayed | H04B 7/00 340/539.11 |
| 2011/0302083 | A1* | 12/2011 | Bhinder | G06Q 20/32 705/44 |
| 2012/0054833 | A1* | 3/2012 | Albisu | G06F 21/36 726/4 |
| 2012/0084846 | A1* | 4/2012 | Weis | G06F 21/34 726/6 |
| 2013/0081119 | A1* | 3/2013 | Sampas | G06Q 20/206 726/7 |
| 2014/0007195 | A1* | 1/2014 | Gupta | G06F 21/34 726/4 |

OTHER PUBLICATIONS

McCune et al., "Seeing-Is-Believing: Using Camera Phones for Human-Verifiable Authentication," 2005 IEEE Symposium on Security and Privacy, Oakland, CA, USA, May 8-11, 2005, Piscataway, NJ, USA, pp. 110-124 (May 8, 2005).

* cited by examiner

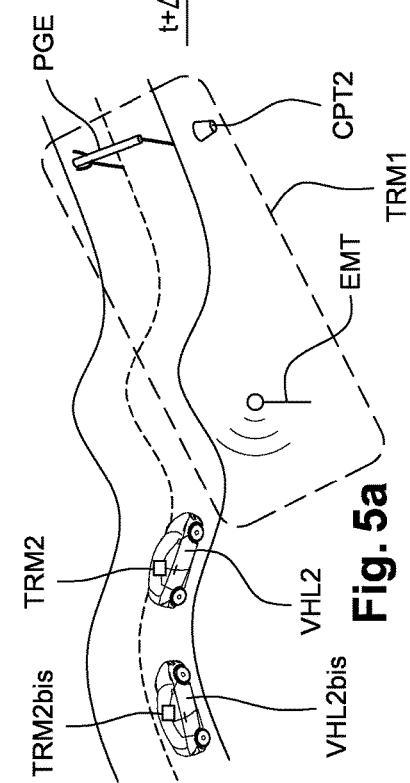
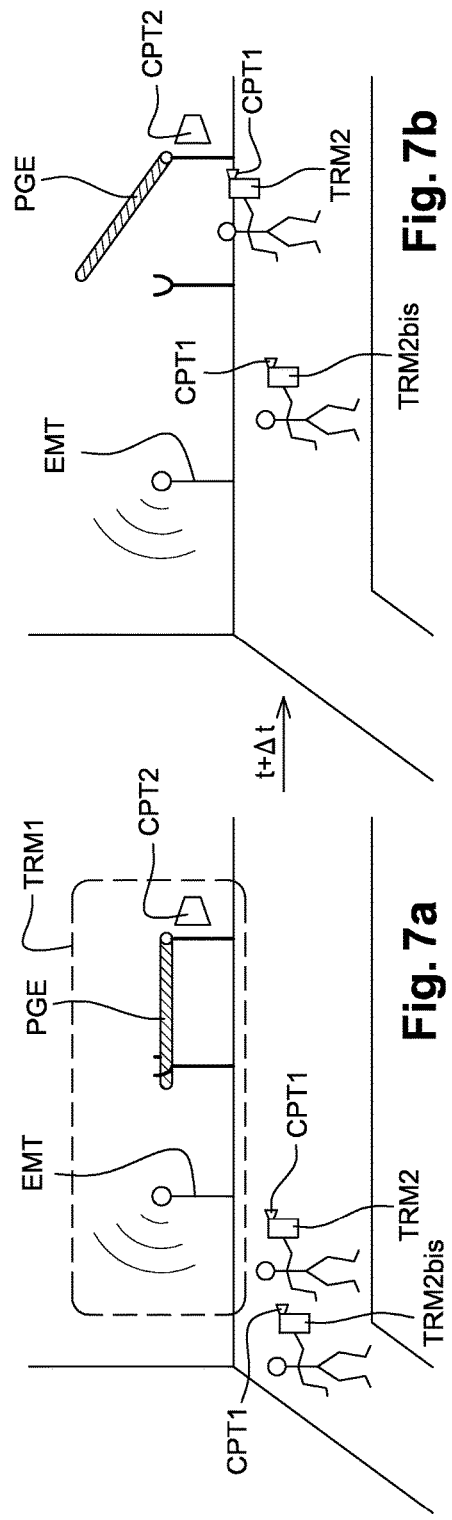

METHOD OF AUTHENTICATING A USER OF A TERMINAL WITH A SERVICE PROVIDER

CROSS-REFERENCE TO RELATED APPLICATIONS

This application is the U.S. national phase of the International Patent Application No. PCT/FR2011/052913 filed Dec. 9, 2011, which claims the benefit of French Application No. 1060589 filed Dec. 16, 2010, the entire content of which is incorporated herein by reference.

TECHNICAL FIELD

The invention relates to the method of authenticating a user of a terminal with a service provider.

The terminal in question covers any data processor device, i.e. any device having hardware and/or software resources including at least one microprocessor, and suitable for communicating over a communications network.

By way of example, the network may be the Internet.

The invention applies more particularly to terminals that do not have data input means, or if they do have data input means, those means are unsuitable or poorly adapted to inputting authentication data. By way of example, the terminal may be a television set suitable for communicating over a communications network such as the Internet.

BACKGROUND

All service providers provide their clients with personalized access to services. A personalized service may for example be sending a multimedia content (film, music, etc.), sending an Internet page including data about a client-user account, etc. Such access requires authentication.

In general manner, in order to access the service, the user makes use of a terminal having input means that can be used for inputting identification and/or authentication data such as an identifier and a password. On receiving them, the provider verifies the identifier and the password and authorizes access to the service if they are correct.

The problem is that the terminal in question is not necessarily fitted with data input means, or if it is fitted with such input means, they need not necessarily be suitable for inputting authentication data.

If the terminal does not have input means, the service cannot be used via that terminal since the provider has no way of authenticating the user of the account that the terminal is seeking to use in order to use a service.

If the terminal is fitted with control means but they are not suitable for inputting authentication data, the service can be used via that terminal, but inputting authentication data such as an identifier and a password is difficult and liable to error. By way of example, the control means could be a remote control when the terminal is a television.

The invention seeks to improve the situation.

SUMMARY

To this end, in one functional aspect, the invention relates to a method of authenticating a user of a terminal referred to as a first terminal, and suitable for communicating with a service provider via a first communications network, said provider requesting an authentication of the user of the first terminal before providing a service to the first terminal, the method being characterized in that the authentication of the user is based on user authentication performed with regard to a second terminal.

In order to authenticate a user with a first terminal, the invention thus reuses authentication data derived from an authentication of the user that has already been carried out with a first terminal. The invention thus avoids new authentication and thus new input of authentication data that can sometimes be difficult given the input means available to the user, e.g. a remote control for a television set.

It is therefore no longer necessary for the first terminal to be fitted with input means for inputting authentication data in order to be authenticated with a service provider. Nor is there any need for pairing between the first and second terminals in order to enable the first terminal to benefit from authentication data coming from the second terminal.

When the first and second terminals are suitable for communicating via the first communications network, and the second terminal is suitable for receiving data from the first terminal via a second communications network of short range, then in a particular implementation of the invention, the method comprises the following steps:

a step of the second terminal receiving a request to deliver authentication data from the first terminal via the second network; and a step of transmitting authentication data from the second terminal via the first network.

Thus, the first terminal sends a request for data to be provided to the second terminal by means of the short-range second network. This short-range network guarantees that the same user is in the proximity both of the first terminal and of the second terminal. This characteristic makes it possible to ensure that the user handling the first and second terminals is the same and not a dishonest third party seeking to be authenticated on the basis of the authentication data of the second terminal.

Thereafter, the authentication data is sent by the second terminal over a network that the second terminal and the service provider have in common.

It should be observed at this point that the above-mentioned authentication data obtained from the second terminal is data that is recognized by the service provider, e.g. because the provider that authenticated the user with respect to the second terminal is the same provider that the user seeks to use in order to receive a service on the first terminal.

In a first variant of this implementation, the request for authentication data issued by the first terminal includes a destination address on the first network to which the authentication data is to be sent.

This variant implementation of the invention enables the second terminal to know where to send the authentication data over the first network. In this example, it can be seen that the destination is an entity connected to the first network. Thereafter, the entity is responsible for providing the authentication data to enable the user of the first terminal to be authenticated and to receive the service on the first terminal.

In a second variant, that may be implemented as an alternative to or in combination with the preceding variant, the step of requesting the delivery of authentication data is performed in a request step by the first terminal requesting a transaction identifier from an entity suitable for delivering transaction identifiers, and the data subsequently transmitted includes the transaction identifier.

By means of this characteristic, the transaction identifier is generated by an entity external to the terminal; this makes it possible to avoid providing all of first terminals with computer programs capable of generating such identifiers. In this configuration, the first terminal sends the transaction identifier to the second terminal; thereafter, the second terminal sends the transaction identifier to the previously-received destination address. As mentioned above, the entity associated with the destination address has generated the transaction identifier; on receiving the transaction identifier from the second terminal, the entity can thus find the authentication request that originated creation of the transaction identifier. Thus, the entity receives proof from the second terminal of authentication performed with regard to the second terminal, which proof is used for authenticating the first terminal in order to enable the first terminal to be used with a service that requires prior authentication.

The first terminal may also be fitted with a signal emitter suitable for conveying data. In this configuration, in a third variant that may be used as an alternative to or in combination with the preceding variant, the second terminal receives the signals emitted by the emitter and from said emitted data it extracts data giving the destination to which the authentication data is to be sent.

In a fourth variant, that may be implemented as an alternative to or in combination with the preceding variant, the signal is a graphic displayed on a screen and the second terminal includes a camera device for capturing the graphic.

The camera thus provides means for communicating between the two terminals, thereby constituting the above-described second network.

In a first hardware aspect, the invention relates to a terminal, referred to as a "first" terminal that is suitable for using a service made available by a service provider after authentication, said terminal being suitable for receiving a service via a communications network, and being characterized in that it includes means for requesting an authentication based on user authentication performed with regard to another terminal.

In an embodiment that is a corollary of the implementation described with reference to the method of the invention, the first terminal is suitable for communicating with said other terminal via the first network, and the first terminal is also being suitable for sending data to said other terminal via a second network. In this configuration, the first terminal includes:
means for requesting authentication data to be provided to another terminal via the second network; and
means for receiving a service via the first network, which service is based on the requested authentication data.

In a first variant, that is a corollary of the first variant described with reference to the method of the invention, the first terminal includes means for incorporating a destination address in the request for authentication data, which destination address is on the first network and is to have the authentication data sent thereto.

In a second variant, that is the corollary of the second variant described with reference to the method of the invention, the first terminal includes:
means for requesting a transaction identifier from an entity suitable for delivering transaction identifiers; and
means for including said transaction identifier in the request to provide authentication data.

In a second hardware aspect, the invention relates to a terminal, referred to as a "second" terminal, suitable for communicating via at least one communications network and for receiving data via a second network, the second terminal including:
means suitable for requesting authentication of a user of the terminal; and
means for sending the resulting authentication data to another terminal for authentication purposes.

In a second embodiment that is the corollary of the implementation described with reference to the method of the invention, the second terminal is suitable for communicating via at least one communications network and for receiving data from another terminal over a second network. In this configuration, the second terminal includes:
means for receiving a request to provide authentication data coming from another terminal over the second network; and
means for transmitting said authentication data via the first network in order to be used for authenticating the other terminal.

In a first variant that is the corollary of the first variant described with reference to the method of the invention, the second terminal includes means for extracting a destination address on the first network from said request to provide authentication data, and means for sending said authentication data to said destination address.

In a second variant that is the corollary of the second variant described with reference to the method of the invention, the second terminal includes means for extracting a transaction identifier from said request to provide authentication data and means for sending said transaction identifier over the first network.

In a third hardware aspect, the invention relates to a first computer program suitable for being implemented on the first terminal as defined above, the program comprising code instructions that, when the program is executed by a processor, perform an authentication step based on means for requesting an authentication based on user authentication performed with regard to another terminal, namely the second terminal.

In an embodiment that is the corollary of the invention described with reference to the method of the invention, the first program performs the following steps:
a step of receiving a request to deliver authentication data from the first terminal via the second network; and
a step of transmitting authentication data from the second terminal via the first network.

In a first variant that is the corollary of the first variant described with reference to the method of the invention, said first program also performs the following steps:
including a destination address on the first network in said request to provide authentication data; and
sending the request to provide authentication data via the second network.

In a second variant, that is the corollary of said second variant described above, said first program also performs the following steps:
requesting a transaction identifier;
including said identifier in the request to deliver authentication data; and
transmitting the request for provision that includes the transaction identifier.

In a fourth hardware aspect, the invention relates to a second computer program suitable for being performed on the second above-defined terminal, the program comprising code instructions that, when the program is executed by a processor, perform a step of authenticating a user of the terminal, and a step of sending the resulting authentication data to another terminal for authentication purposes, namely the first terminal.

In a first variant that is the corollary of the first variant described with reference to the method of the invention, said second program also performs the following steps:

extracting a destination address on the first network from said request to deliver authentication data; and transmitting said authentication data to said destination address.

In a second variant, that is the corollary of said above-described second variant, said computer program also performs the following steps:

extracting a transaction identifier from said request to provide authentication data; and sending said transaction identifier over the first network.

The invention can be better understood on reading the following description given by way of example and made with reference to the accompanying drawings.

BRIEF DESCRIPTION OF THE DRAWINGS

FIGS. 5a and 5b show the second implementation, the figure representing the same scene at different instants.

FIGS. 7a and 7b show a third implementation, the figures showing the same scene at different instants.

DETAILED DESCRIPTION

Figure 1:
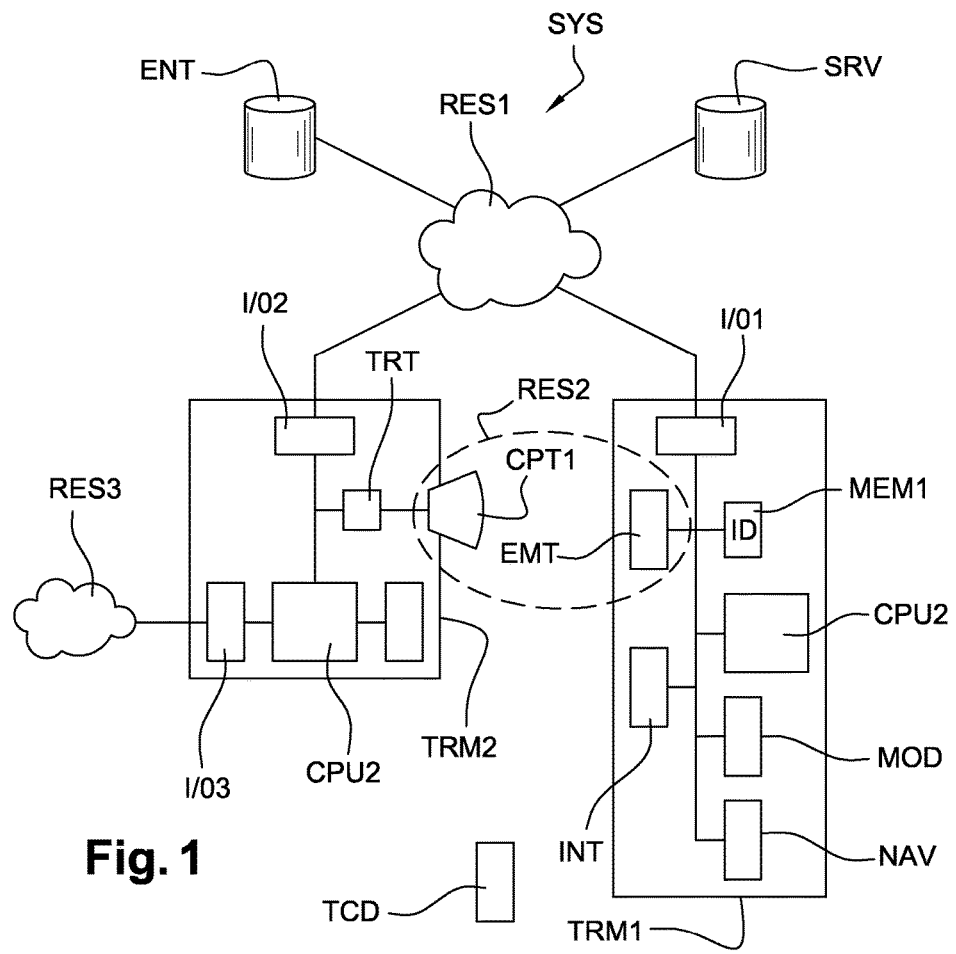
FIG. 1 shows a computer system illustrating a first implementation of an authentication method of the invention.

FIG. 1 shows a system SYS comprising a server SRV belonging to a service provider and a terminal TRM1, referred to as a "first" terminal, that are connected together by means of a communications network RES1, referred to below as the "first" network, such as an Internet network.

The system also includes a second terminal TRM2 connected to the first network RES1.

The second terminal TRM2 is suitable for receiving data from the first terminal via a second network of short range. A network is said herein to be of "short range" when its coverage is limited in distance. In this context, the first terminal is capable of communicating data via the second network RES2 up to a distance DIST.

The coverage of the second network RES2 is selected to be such that potential communication between the two terminals using this second network is indicative of the terminals being in the proximity of each other and implying that the user is in the proximity of both terminals. By way of example, the second network in question is a radio frequency identification (RFID) network or a Bluetooth network.

As explained below, the second network may also be constituted by a visible code generator and a camera device capable of taking a picture of the code and of extracting information therefrom. A sound pickup device or a light emitter may also be used to emit signals, with the code being emitted in the form of a sound or of light, respectively.

More generally, the first terminal includes an emitter suitable for emitting signals conveying data, and the second terminal includes a sensor suitable for sensing the signals, namely a microphone, a motion detector, or a light sensor.

The invention is illustrated by means of several examples, beginning with a first example.

In the first example, the first terminal TRM1 is a television having a first microprocessor CPU1 suitable for communicating with a module MOD that is suitable for requesting an identifier referred to as a "transaction ID" from an entity ENT as described below; the entity ENT is suitable for generating an identifier and for sending this identifier to the first terminal. The identifier may equally well be a two-dimensional code (referred to as a 2D code by the person skilled in the art), or sound signals or light signals suitable for conveying data. It should be recalled that a 2D code is a generally black and white pictogram containing information.

The first microprocessor CPU1 is also suitable for communicating with a first memory MEM1 that is suitable for storing the identifier ID.

The first microprocessor CPU1 is also suitable for communicating with playback means EMT for playing back the code. In this example, the playback means are a screen. The invention is not limited to playback means of this type. As mentioned above, a sound emitter could equally well be used for emitting a signal representative of a code.

The first microprocessor CPU1 is also suitable for communicating with optional interface means INT for communicating with a remote control TCD that is suitable for issuing commands via a keypad having selectable keys. The keys make it possible in particular to select television channels, etc. These means are useful for illustrating the first implementation, while the other implementations do not require communication with control means such as a remote control.

Naturally, the invention is not limited to terminals having a remote control, but extends to any type of terminal whether or not it has control means.

The first microprocessor CPU1 is also suitable for communicating with input/output means I/O1 for providing communication over the first network.

The first terminal TRM1 also optionally includes a browser NAV for browsing the Internet and a display for displaying data in the form of Internet pages. In this example, the browser NAV is suitable for sending requests over the Internet and for receiving replies. The browser is useful for illustrating the first implementation as described below.

In this example, the second terminal TRM2 is a so-called "third-generation" telephone. This second terminal in this example has a subscriber identity module (SIM) card. This module is suitable for authenticating the user of the second terminal with a third network RES3.

Although a misuse of language, the present specification states that the user is authenticated via the terminal, in order to simplify the description. Nevertheless, it should be observed that, in fact, it is the SIM card that is authenticated and not the user. However, in general manner, each SIM card belongs to a single user only, so authenticating the card also amounts to authenticating the user.

The telephone TRM2 also has a microprocessor CPU2 referred to as the "second" microprocessor and suitable for communicating with processor means TRT connected to signal receiver means CPT1 such as camera means; the receiver means may for example be a camera, a microphone, an accelerometer, a light sensor; the processor means may for example be a computer application.

The second microprocessor CPU2 is also suitable for communicating with input/output means I/O2 suitable for receiving and sending data over the first network RES1. In this example that is the Internet.

The second microprocessor CPU2 is also suitable for communicating with input/output means I/O3 for communicating with the third network RES3.

It should be observed that the above-described storage means MEM1 and MEM2 (included in TRM2) may be any kind of storage means; for example they may be Flash type memory, random access memory (RAM), etc.

In this example, the system also has an entity ENT capable of generating 2D codes on request. This entity is connected to the first network RES1.

In this example, the entity ENT has a uniform resource locator (URL) address on the Internet. This entity acts as a trusted third party for the first terminal, the second terminal, and the server SRV.

The system also has a service provider SRV such as a telecommunications operator providing services such as access to a zone, access to multimedia content, etc. The provider has computer resources such as a server for providing those services. In this example the server is connected to the first network, i.e. the Internet.

In this first example, and also in the two following examples, the first terminal TRM1, the second terminal TRM2, the entity ENT, and the provider SRV are thus connected to one another via the Internet.

In the examples below, it is assumed that the first and second terminals are not paired. The two terminals therefore do not know each other in the sense that neither of them has means for recognizing the other one of them. In this example, the first terminal has no means for detecting second terminals in its coverage range. In addition, only the second terminals have the ability to receive a signal coming from a first terminal TRM1. The invention is not limited to this example. Even though it would not be very advantageous, the invention could naturally be performed using terminals that are paired and that are capable of communicating with each other.

Figure 2:
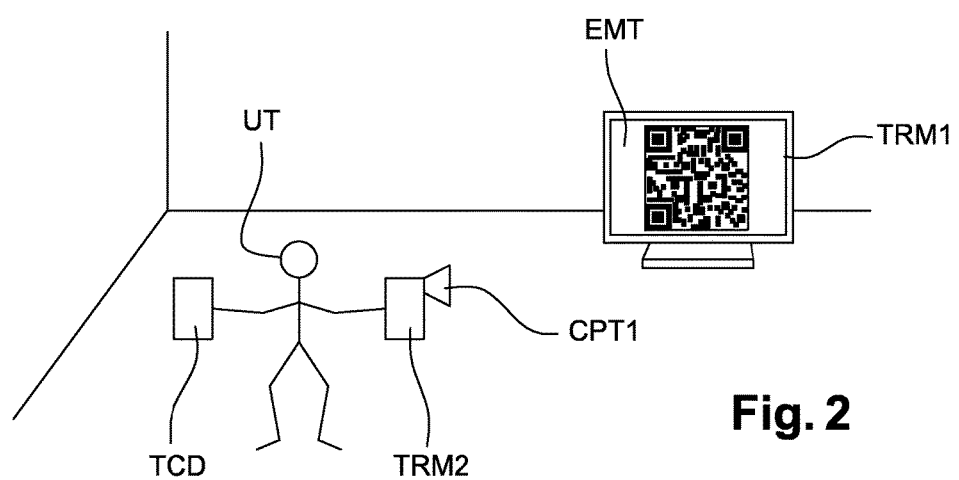
FIG. 2 shows a scene illustrating a first implementation.

There follows an example illustrating the method of the invention. FIG. 2 is a diagram representing a scene. In this scene, a user is in a room together with a telephone TRM2. The room also has a television TRM1 connected to the Internet. As explained above, the television has an interface INT that can be manipulated by using a remote control TCD. The remote control has keys for selecting commands suitable for issuing to the television set TRM1 for processing.

So far as the user is concerned, the idea is to be authenticated with the service provider SRV in order to receive personalized services such as the possibility of using a service on the first terminal TRM1.

This implementation comprises two stages:
a first stage PH1 during which the user of the telephone is authenticated, e.g. with a telecommunications operator via the second terminal, e.g. via a SIM card included in the terminal; and
a second stage PH2 during which authentication data associated with the first stage is used in order to authenticate the television TRM1.

It should be observed that the first stage may be performed before the second stage or during the second stage.

During the first stage PH1, the user is authenticated over the third network RES3 by means of the telephone TRM2. This results in proof of authentication, in this example a "cookie", being stored in the second memory MEM2. The telephone user can then make use of this proof in order to use on-line services via the television when the service provider recognizes the proof in question as being sufficient proof.

It is recalled at this point that a "cookie" is defined by the HTTP communications protocol as being a data string sent by an HTTP server to an HTTP client, and the client returns it each time the same HTTP server interrogates it under certain conditions. The cookie is sent in the HTTP header by the web server to the web browser, which returns it unchanged each time it accesses the server. A cookie may be used for authentication, for a session (maintaining a state), and for storing specific information about the user.

It should be observed that this proof of authentication, i.e. the cookie, is not necessarily stored in the memory MEM2 of the terminal. The proof of authentication could be transmitted directly to the entity ENT without it being necessary for it to be stored in the second terminal TRM2.

Figure 3:
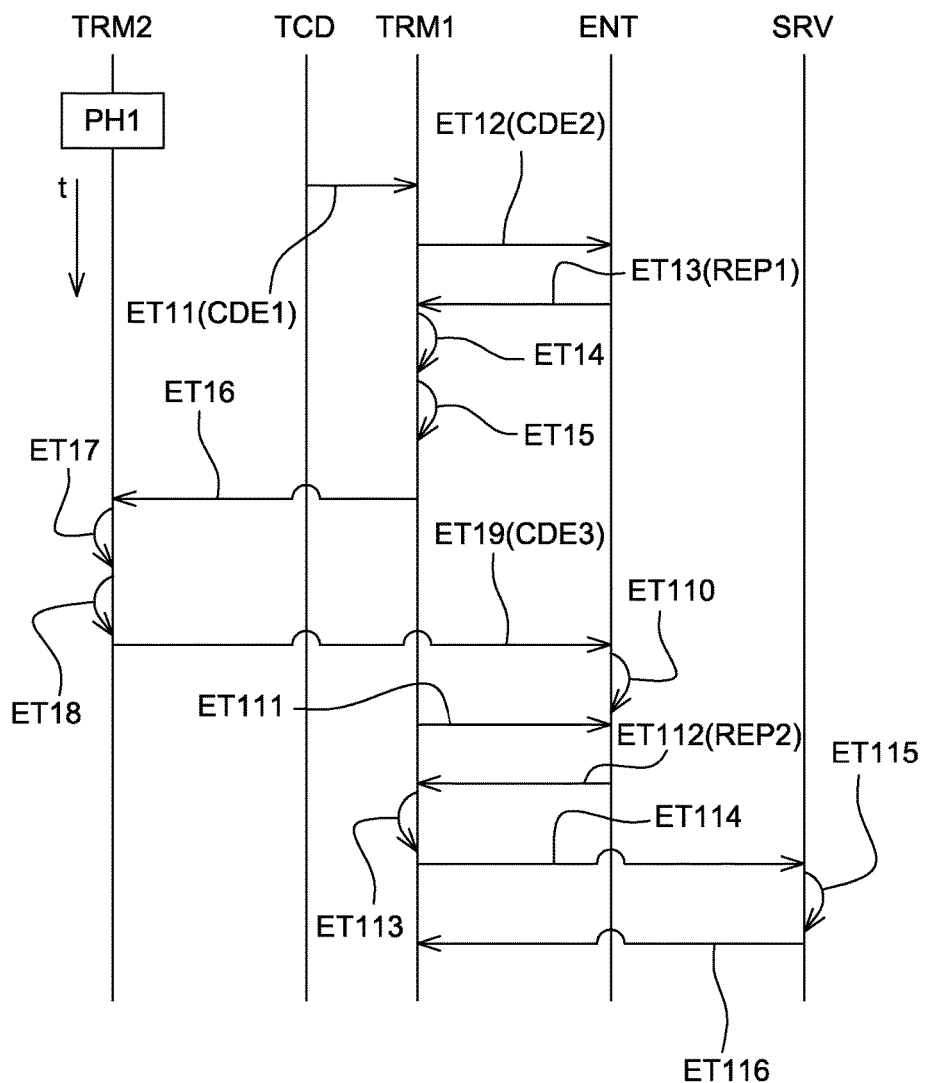
FIG. 3 is a diagrammatic view of the data exchanges carried out in a first implementation.
Figure 6:
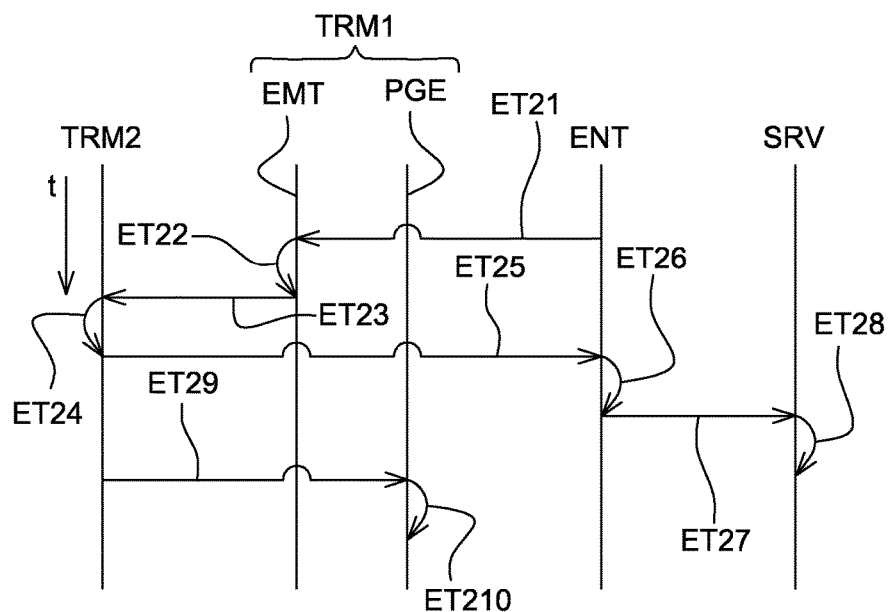
FIG. 6 is a diagrammatic view of the data exchanges performed in the second implementation.

The second stage PH2 is made up of a plurality of steps ET11 to ET115. These steps are described with reference to FIG. 3 having axes that illustrate the exchange of data that takes place between the first terminal, the second terminal, the entity, and the provider, respectively. In this figure, and also in FIG. 6, a time axis indicates the order in which the steps are executed. In FIGS. 3 and 6, a data exchange is symbolized by an arrow having an origin and an end, the origin being associated with the sender of a message, the end being associated with the destination of the message. Thus, an arrow having an origin and an end on the same axis represents processing internal to a device.

During a first step ET11, the user UT uses the remote control TCD and selects a command CDE1, referred to as the "first" command, suitable for initiating an authentication request. At this instant, the first microprocessor receives the command CDE1 via the interface INT.

During a second step ET12, the first microprocessor CPU1, knowing the URL address of the entity on the first network RES1, sends a command CDE2 to the entity ENT requesting the generation of a 2D code that includes as information the URL address of the entity ENT and a transaction identifier ID.

The entity ENT generates a 2D code and sends it in a reply REP1 back to the television TRM1 during a third step ET13.

During a fourth step ET14, the first microprocessor CPU1 receives the reply, stores it incidentally in the memory MEM1, and causes the received 2D code to be displayed on the screen EMT.

During a fifth step ET15, the screen displays the 2D code.

During a sixth step ET16, the user uses the telephone to photograph the 2D code displayed on the screen EMT.

During a seventh step ET17, the camera means CPT1 take a picture and transmit it during an eighth step ET18 to the processor means TRT. The processor means decode the 2D code and deduce the decoded information, i.e. the URL address of the entity ENT and the transaction identifier ID.

During a ninth step ET19, the second microprocessor CPU2, now knowing the address of the entity ENT, uses a third command CDE3 to cause the cookie and the identifier ID to be sent to the entity ENT.

During a tenth step ET110, the entity ENT receives the third command CDE3 and extracts the data included in the third command, namely the transaction identifier ID and a proof of authentication of the user (e.g.: cookie).

In this example, while the steps of this second stage are taking place, the browser present in the television TRM1 sends interrogation requests at regular intervals to the entity ENT. The function of these interrogation requests is to ask the entity whether it has received a cookie about the transaction identifier ID.

It should be observed that other means could be used instead of making repeated interrogation requests. For example, the entity may include means suitable for notifying the television that it has received a cookie from the telephone TRM2. In this configuration, the television is fitted with a notification reception module (not shown in the figures).

During an eleventh step ET111, the entity ENT receives an interrogation request from the browser NAV present in the television and responds by means of a reply REP2 during a twelfth step ET112, the reply including a cookie.

During a thirteenth step ET113, the television receives the cookie and stores it in memory.

During a fourteenth step ET114, the television transmits the cookie to the provider SRV.

During a fifteenth step ET115, the provider SRV receives the cookie as proof of authentication and provides the service to the first terminal during a sixteenth step ET116, providing the cookie is accepted as proof of authentication of the user UT.

The format of the cookie delivered by the telephone may not be suitable for the provider. In a variant, a module present in the television may be provided for transforming that format into a format that is accepted by the provider.

It should also be observed that the entity ENT may form an integral portion of the server SRV or of the television TRM1.

The invention is not limited to the above-described example. Other examples described below illustrate two other implementations.

Figure 4:
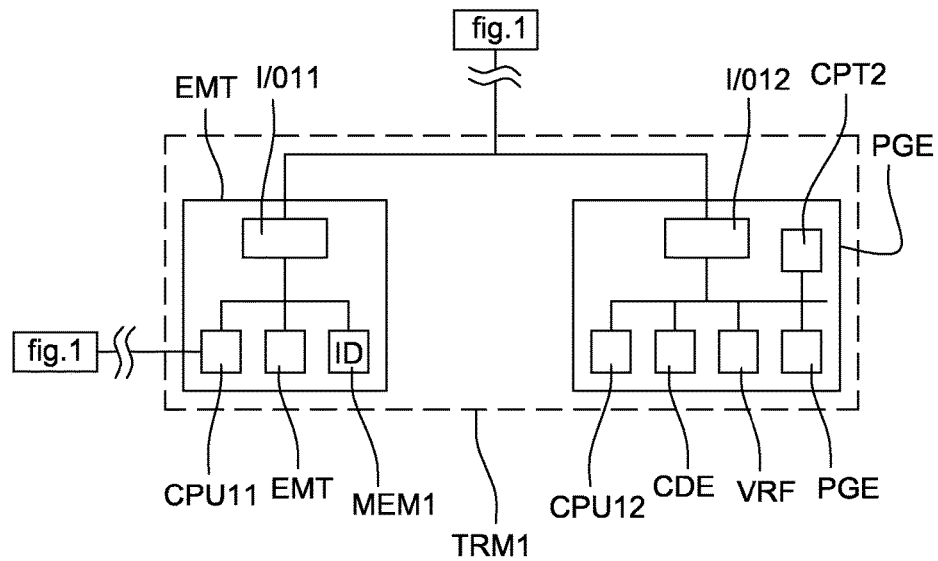
FIG. 4 is a diagrammatic view of a terminal for illustrating second and third implementations.

In these examples, and with reference to FIG. 4, the first terminal TRM1 is made up of two portions.

A first portion EMT includes a microprocessor CPU11 connected via a data bus to playback means EMT, to memory means MEM1 storing the transaction identifier ID, and to input/output means I/O11 enabling the microprocessor CPU11 to communicate via the first network.

A second portion PGE includes a microprocessor CPU12 connected via a data bus to means for verifying an access right, to capture means CPT2, e.g. camera means, to control means CDE for controlling authorization, e.g. access to a zone such as a movie theater, and to input/output means I/O12 enabling the microprocessor CPU12 to communicate via the first network RES1.

The invention may be illustrated on the basis of a second implementation in which the first terminal TRM2 is a terminal suitable for sending signals containing data, the signals being light signals or sound signals, for example, and taking the place of a 2D code.

The second example is illustrated with reference to FIGS. 5a and 5b that both show the same scene but at different instants, namely at an instant "t" and at a later instant "t+Δt", respectively.

In this second example, the signals are repeated constantly. As a result, in this example, the user does not need to act on the emitter EMT in order to receive data from the emitter EMT.

The scene is as follows: two users having respective telephones are traveling in respective vehicles, namely a first vehicle VHL2 and a second vehicle VHL2bis, along a road where there is a toll PGE. In this embodiment, the vehicles are heading towards the toll PGE. The steps of the method are as follows.

It is assumed that the above-described first stage PH1 has already taken place.

In this second implementation, the first terminal has a first portion including a sound signal emitter instead of a screen for displaying a 2D code, and a second portion including a barrier that can be opened under remote control by the service provider SRV. In this example, the barrier is coupled to a camera device CPT2 suitable for example for photographing a vehicle in order to identify the vehicle in question, e.g. by means of its number plate.

Once more, it should be recalled that below, by misuse of language and in order to simplify the description, it is stated that it is the terminal that is authenticated. To be more accurate, it should be said that it is the user who is authenticated with the service via the terminal.

The second stage PH2 comprises a plurality of steps ET21 to ET29. In this example, the steps below are executed on each of the terminals TRM2 and TRM2bis on going past the emitter EMT. In order to simplify the description of the invention, attention is paid only to one of the terminals, namely the terminal TRM2. FIG. 6 shows the exchange of data in this second implementation. As in FIG. 3, FIG. 6 shows the data exchange that takes place between the first terminal, the second terminal, the entity, and the provider. In FIG. 6, a time axis indicates the order in which steps are executed.

During a first step ET21, the microprocessor CPU11 of the emitter EMT receives a transaction identifier ID from the entity ENT and stores it, e.g. in the memory MEM1.

During a second step ET22, the emitter EMT emits sound signals suitable for conveying as data the URL address of the entity ENT and the received transaction identifier.

During a third step ET23, the receiver means, i.e. the microphone installed in the second terminal TRM2, receives the sound signals via a microphone.

During a fourth step ET24, the receiver means CPT1 forward the received signals to the treatment means TRT. The treatment means decode the signals and deduce decoded information, namely the URL address of the entity ENT and the transaction identifier ID.

During a fifth step ET25, the second microprocessor CPU2, knowing the URL address of the entity ENT, causes a proof of authentication of the user to be sent to the entity ENT, i.e. in this example a cookie present in the second terminal. By way of example, it also sends an identifier suitable for identifying the second terminal, e.g. the mobile subscriber ISDN number (MSISDN) of the second terminal.

During a sixth step ET26, the entity ENT receives the command and it extracts the data included in the command, namely the transaction identifier ID and the proof of authentication of the user (e.g. cookie).

During a seventh step ET27, the entity ENT sends a message to the server SRV indicating that the user is properly authenticated and adding the MSISDN identifier in the message.

During an eighth step ET28, the server searches a database for a number plate number corresponding to the received MSISDN identifier.

During a ninth step ET29, the camera means CPT2 photograph the various number plate numbers of vehicles situated at a toll PGE, one after another, and authorizes opening of the barrier during a tenth step ET210, providing the number obtained from the correspondence table matches the photographed number.

A third implementation may be that of accessing a movie theater. This implementation is illustrated with reference to FIGS. 7a and 7b that show the same scene at different successive instants, namely at an instant "t" and at an instant "t+Δt", respectively.

Two users having respective terminals TRM2 and TRM2bis are in the entrance hall of a movie theater. In this example, the entrance hall includes an emitter EMT suitable for example for emitting light signals capable of conveying data, namely the URL address of the entity ENT and the transaction identifier ID.

The steps are the same as in the second implementation except that on receiving the transaction identifier ID from the second terminal, the entity ENT issues a ticket to the second terminals TRM2 and TRM2*bis*, e.g. in the form of respective 2D codes, which the users in question present to an entry gate, which takes the place of a toll barrier. In this configuration, at the instant "t", a second terminal TRM2 enters into the range of the emitter EMT and receives a URL designating a resource of the entity. Thereafter the second terminal TRM2 sends its MSISDN identifier to the entity ENT (via the URL) and it receives in return an entry ticket from the entity ENT.

Thereafter, at a later instant "t+Δt", the second terminal TRM2, when situated close to the gate, displays the ticket on its screen, which ticket is photographed by the camera means CPT2.

The camera means CPT2 pick up the tickets on each of the terminals TRM2 and TRM2*bis* one after another and authorize opening of the barrier if the number found from the correspondence table matches the number as photographed.

The first terminal TRM1, more precisely its second portion PGE, then sends the ticket to the server SRV in order to verify that the ticket is valid. If the ticket is valid, and possibly after verifying that the account associated with the MSISDN identifier is solvent, the server sends a command to open the gate so that the user of the second terminal can enter the movie theater.

These two last implementations share the common feature of the signals emitted by the emitter EMT being the same over a given period of time and being received by a plurality of second terminals TRM2, TRM2*bis* during that period.

It should also be observed that the user may be an individual or a body corporate.

It should also be observed that the coverage distance of the emitter associated with the first terminal TRM1 is selected to be such that it ensures that both terminals TRM1 and TRM2 are co-located. Co-location must be adapted to context, for example a few centimeters in a home application, several meters in an urban application.

The invention claimed is:

1. A method of authenticating a user to use a first terminal requesting access to a service, wherein the first terminal is communicatively linked with a service provider via a communications network, the method comprising:
   the first terminal requesting an access to the service;
   the first terminal receiving a code via the communications network,
   in response to reception of the code, the first terminal displaying the code visually on a screen to a second terminal, wherein the code is a two-dimensional code,
   said code including a request to deliver authentication data stored on the second terminal to a service provider via the communications network,
   said code comprising a transaction identifier,
   the second terminal photographing the code,
   the second terminal extracting, from the code, the transaction identifier, and
   the second terminal transmitting said authentication data stored on said second terminal and the transaction identifier to the service provider via the communications network, and
   in response to the authentication data and the transaction identifier having been delivered, the first terminal receiving the service from the service provider via the communications network.

2. The method of claim 1, further comprising:
   the second terminal
      extracting, from the code, a destination address on the communications network, and
      wherein transmitting the authentication data to the service provider via the communications network comprises using the destination address to transmit the authentication data.

3. The method of claim 1, wherein the second terminal transmitting the authentication data to the service provider via the communications network comprises the second terminal transmitting a cookie containing the authentication data to the service provider via the communications network.

4. A method of authenticating a user to use a first terminal, wherein the first terminal is communicatively linked with a service provider via a communications network, the method comprising:
   the first terminal receiving a code via the communications network,
   in response to reception of the code, the first terminal displaying the code visually on a screen to a second terminal, wherein the code is a two-dimensional code,
   said code including a request to deliver authentication data stored on the second terminal to a service provider via the communications network,
   said code comprising a transaction identifier,
   the second terminal photographing the code,
   the second terminal extracting, from the code, the transaction identifier and a destination address on the communications network, and
   the second terminal using the destination address to transmit said authentication data stored on said second terminal and the transaction identifier to the service provider via the communications network, and
   in response to the authentication data and the transaction identifier having been delivered, the first terminal receiving a service from the service provider via the communications network.

* * * * *